[12] United States Patent
Koshikawa et al.

(10) Patent No.: US 11,186,250 B2
(45) Date of Patent: Nov. 30, 2021

(54) AIR BAG AND AIR BAG DEVICE

(71) Applicant: JOYSON SAFETY SYSTEMS JAPAN K.K., Tokyo (JP)

(72) Inventors: Kimihiro Koshikawa, Shiga (JP); Shinichi Takeuchi, Shiga (JP); Ryo Hayakawa, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 51 days.

(21) Appl. No.: 16/645,765

(22) PCT Filed: Aug. 21, 2018

(86) PCT No.: PCT/JP2018/030783
§ 371 (c)(1),
(2) Date: Mar. 9, 2020

(87) PCT Pub. No.: WO2019/058837
PCT Pub. Date: Mar. 28, 2019

(65) Prior Publication Data
US 2020/0282946 A1 Sep. 10, 2020

(30) Foreign Application Priority Data
Sep. 21, 2017 (JP) .............................. JP2017-181450

(51) Int. Cl.
*B60R 21/2338* (2011.01)
*B60R 21/203* (2006.01)
*B60R 21/237* (2006.01)

(52) U.S. Cl.
CPC ........ *B60R 21/2338* (2013.01); *B60R 21/203* (2013.01); *B60R 21/237* (2013.01); *B60R 2021/23382* (2013.01)

(58) Field of Classification Search
CPC ........ B60R 2021/23382; B60R 21/203; B60R 21/2338; B60R 21/237
See application file for complete search history.

(56) References Cited

U.S. PATENT DOCUMENTS 6,086,092 A * 7/2000 Hill ....................... B60R 21/233
280/729
6,209,911 B1 * 4/2001 Igawa ................... B60R 21/233
280/728.2

(Continued)

FOREIGN PATENT DOCUMENTS

DE   10 2010 039 759 A1   1/2012
JP   H08-324373 A   12/1996

(Continued)

OTHER PUBLICATIONS

International Searching Authority, "International Search Report," issued in connection with International Patent Application No. PCT/JP2018/030783, dated Oct. 30, 2018.

(Continued)

*Primary Examiner* — Laura Freedman
(74) *Attorney, Agent, or Firm* — Foley & Lardner LLP

(57) ABSTRACT

Provided is an airbag configured so that, in the inflated state thereof, a recess is formed in a chest restraint area in the passenger facing surface of the airbag, and the portion of the airbag other than the recess has a large inflation thickness. A driver-side airbag 1 is formed by sewing a front panel 2 and a rear panel 3 together. The rear panel 3 is provided with a left tuck portion 12 which extends from the upper left to the lower left, and a right tuck portion 11 which extends from the upper right to the lower right. The tuck portions 11 and 12 increase the inflation thickness of the driver-side airbag 1. A recess 6 is formed in a passenger chest restraint area in the driver-side airbag 1 by a tether 20.

8 Claims, 4 Drawing Sheets

(56) References Cited

U.S. PATENT DOCUMENTS

| | | | |
|---|---|---|---|
| 6,610,000 B1* | 8/2003 | Ishii | B60R 21/201 |
| | | | 280/728.1 |
| 6,736,426 B2* | 5/2004 | Winters | B60R 21/233 |
| | | | 280/743.2 |
| 6,929,285 B2* | 8/2005 | Yamada | B60R 21/233 |
| | | | 280/743.2 |
| 7,108,282 B2* | 9/2006 | Hasebe | B60R 21/233 |
| | | | 280/743.1 |
| 7,195,275 B2* | 3/2007 | Abe | B60R 21/231 |
| | | | 280/729 |
| 7,198,290 B2* | 4/2007 | Yamada | B60R 21/233 |
| | | | 280/731 |
| 7,281,734 B2* | 10/2007 | Abe | B60R 21/233 |
| | | | 280/729 |
| 7,445,238 B2* | 11/2008 | Marriott | B60R 21/217 |
| | | | 280/729 |
| 7,458,605 B2* | 12/2008 | Hasebe | B60R 21/233 |
| | | | 280/729 |
| 8,382,154 B2* | 2/2013 | Suzuki | B60R 21/239 |
| | | | 280/739 |
| 8,678,429 B2 | 3/2014 | Nagasawa et al. | |
| 9,027,963 B2* | 5/2015 | Murakami | B60R 21/2338 |
| | | | 280/743.2 |
| 9,333,939 B2* | 5/2016 | Koshikawa | B60R 21/203 |
| 9,555,764 B2* | 1/2017 | Hiruta | B60R 21/2342 |
| 10,266,145 B2* | 4/2019 | Paxton | B60R 21/2338 |
| 10,279,769 B2* | 5/2019 | Nakanishi | B60R 21/205 |
| 10,493,945 B2* | 12/2019 | Anderson | B60R 21/2338 |
| 10,507,785 B2* | 12/2019 | Ishiguro | B60R 21/2338 |
| 10,647,284 B2* | 5/2020 | Koshikawa | B60R 21/231 |
| 10,787,147 B2* | 9/2020 | Fujimaki | B60R 21/203 |
| 2002/0038949 A1 | 4/2002 | Okada et al. | |
| 2013/0093171 A1 | 4/2013 | Eckert et al. | |
| 2013/0181429 A1 | 7/2013 | Weng et al. | |
| 2017/0210327 A1 | 7/2017 | Abe et al. | |

FOREIGN PATENT DOCUMENTS

| | | | | |
|---|---|---|---|---|
| JP | H11-20586 A | | 1/1999 | |
| JP | 2002-053000 A | | 2/2002 | |
| JP | 2003-276546 A | | 10/2003 | |
| JP | 2005-247118 A | | 9/2005 | |
| JP | 3922764 B2 | | 5/2007 | |
| JP | 2007-302192 A | | 11/2007 | |
| JP | 2009006874 A | * | 1/2009 | B60R 21/239 |
| JP | 2010-132215 A | | 6/2010 | |
| JP | 2010-201980 A | | 9/2010 | |
| JP | 2010-241241 A | | 10/2010 | |
| JP | 2011-057155 A | | 3/2011 | |
| JP | 2011-246007 A | | 12/2011 | |
| JP | 2012-061882 A | | 3/2012 | |
| JP | 2013-529577 A | | 7/2013 | |
| JP | 2016-147507 A | | 8/2016 | |
| JP | 2017-132313 A | | 8/2017 | |
| KR | 2009-0030614 A | | 3/2009 | |

OTHER PUBLICATIONS

International Searching Authority, "Written Opinion," issued in connection with International Patent Application No. PCT/JP2018/030783, dated Oct. 30, 2018.

* cited by examiner

AIR BAG AND AIR BAG DEVICE

CROSS-REFERENCE TO RELATED APPLICATIONS

The present application claims priority under 37 U.S.C. § 371 to International Patent Application No. PCT/JP2018/030783, filed Aug. 21, 2018, which claims priority to and the benefit of Japanese Patent Application No. 2017-181450, filed on Sep. 21, 2017. The contents of these applications are hereby incorporated by reference in their entireties.

TECHNICAL FIELD

The present invention relates to an airbag and an airbag device for restraining a passenger in a car collision. In this specification, when the airbag is a driver-side airbag, the upper, lower, left, and right of the airbag represent the upper, lower, left, and right when the airbag is attached to a steering in a straight traveling state of the vehicle and inflated.

BACKGROUND ART

The airbag device is configured to operate an inflator (gas generator) to eject gas in an emergency such as a vehicle collision, supply gas to the airbag, inflate the airbag, and restrain a passenger.

Patent Literature 1 describes a driver-side airbag having a tether which connects a lower center portion of a passenger facing surface and a steering side. In the driver-side airbag of Patent Literature 1, a recess is formed at the lower center portion of the passenger facing surface.

[Patent Literature 1]: US Patent Publication No. 2013/0181429

SUMMARY OF INVENTION

An object of the invention is to provide an airbag in which, in an inflated state, a recess is formed in a chest restraint area of a passenger facing surface and an inflation thickness of a portion other than the recess is large.

An airbag of the invention is a driver-side airbag which is formed by connecting peripheral edges of a front panel and a rear panel, in which the front panel has a tuck portion in a passenger's shoulder restraint area and a tether connecting a chest restraint area of the front panel and the rear panel is provided.

An airbag device of the invention includes the airbag and an inflator.

The airbag according to an aspect of the invention includes a left tuck portion which extends downward from an upper left and a right tuck portion which extends downward from an upper right as the tuck portion.

According to another aspect of the invention, a distance between the left tuck portion and the right tuck portion is gradually reduced as it goes to a lower side.

According to still another aspect of the invention, the left tuck portion and the right tuck portion are separated.

According to further still another aspect of the invention, a lower end of the left tuck portion is in contact with a lower end of the right tuck portion.

According to further still another aspect of the invention, the tether is connected to a lower center side of the front panel.

According to further still another aspect of the invention, the tether includes a center portion connected to the front panel, a first leg portion extending from a right side of the center portion, a second leg portion extending from a left side of the center portion, and a third leg portion extending from an upper side.

According to further still another aspect of the invention, the third leg portion is provided with an arm portion extending laterally, the arm portion is provided with a tear line, and further a slit is provided in the third leg portion so as to be located on an extension line of the tear line.

According to further still another aspect of the invention, a tip side of the tether is connected to a steering side by an inflator mounting ring for attaching the inflator to a retainer.

Advantageous Effects of Invention

When the rear panel of the airbag according to the invention is in an inflated state of the front panel, the inflation thickness of the shoulder restraint area is increased by expanding the tuck portion. In the airbag of the invention, since the recess is formed in the chest restraint area by the tether, the load on the chest when restraining a passenger is reduced.

DESCRIPTION OF EMBODIMENTS

Hereinafter, an embodiment will be described with reference to the drawings.

Figure 5:
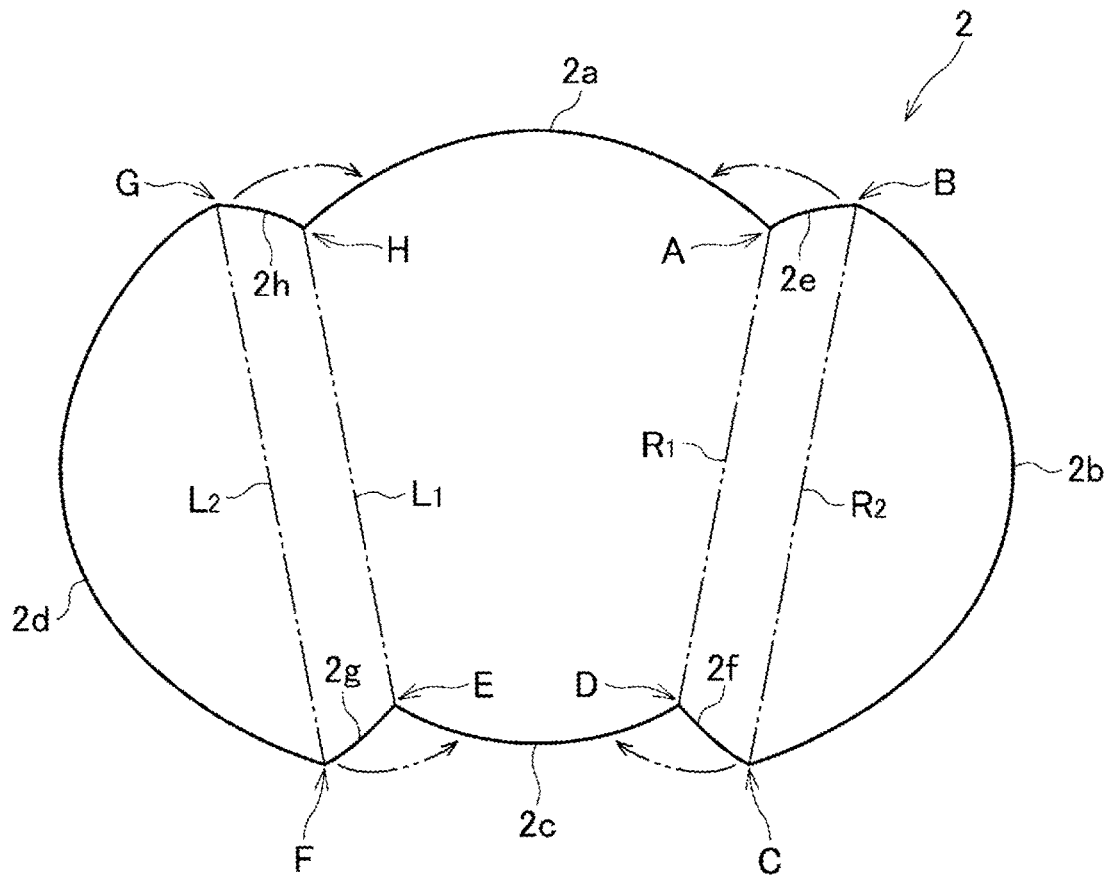
FIG. 5 is a plan view of the front panel of the airbag according to the embodiment in a state before a tuck portion is folded back.
Figure 6:
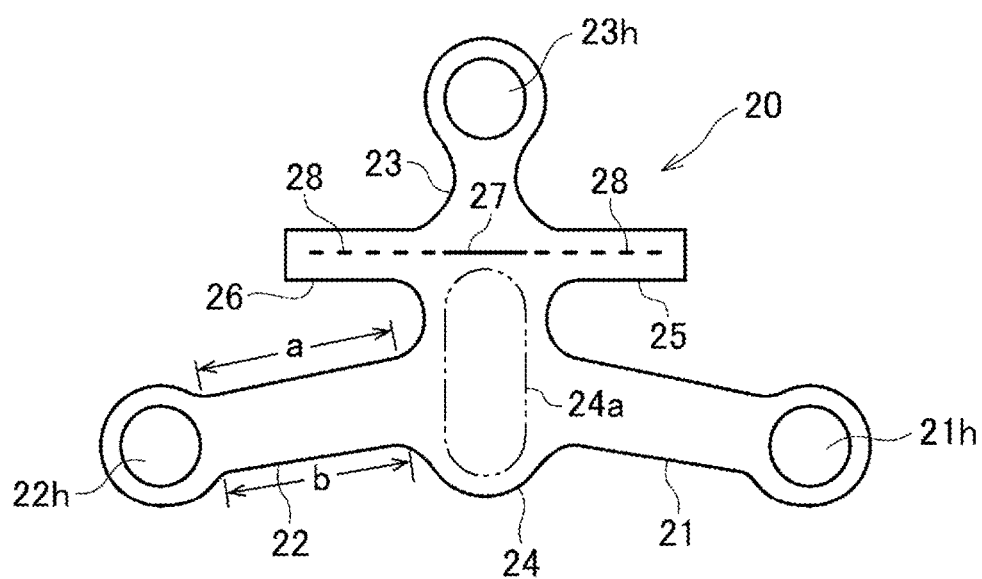
FIG. 6 is a plan view of a tether.
Figure 7:
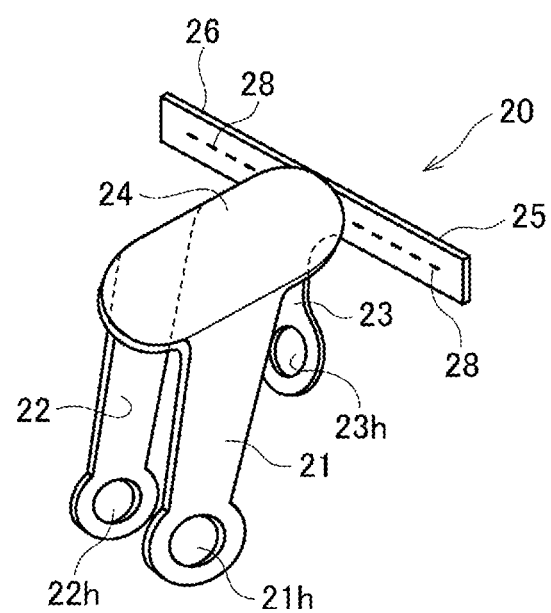
FIG. 7 is a perspective view of the tether.

FIGS. 1 to 4B illustrate a driver-side airbag 1 according to the embodiment. FIG. 5 illustrates a front panel and FIGS. 6 and 7 illustrate tethers. The airbag 1 includes a front panel 2 constituting a passenger facing surface and a rear panel 3 constituting an opposite side (steering side) from the passenger facing surface. The rear panel 3 is constituted of a circular panel (base fabric).

An inflator opening 5 is provided at a substantially central portion of the rear panel 3. Although not illustrated, a small hole for inserting a bolt is provided around the inflator opening 5. A vent hole is provided at a predetermined distance from the inflator opening 5.

The front panel 2 has a laterally symmetric, substantially oval shape with a lateral length that is greater than a vertical width.

Figure 2:
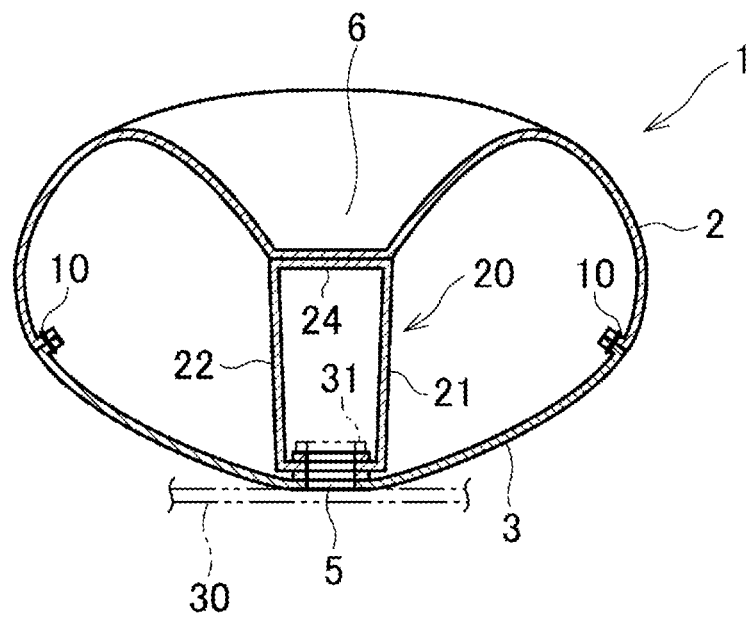
FIG. 2 is a cross-sectional view taken along the line II-II in FIG. 1.

As illustrated in FIG. 5, the front panel 2 is folded along planned folding lines L1, L2, R1, and R2, thereby forming a right tuck portion 11 and a left tuck portion 12 (FIG. 3), and then stitched with the rear panel 3 by a suture thread 10 (FIG. 2).

Hereinafter, the shape of the front panel 2 and the folding method thereof will be described in detail.

As illustrated in FIG. 5, the outer peripheral edge of the front panel 2 has an upper outer peripheral edge 2a, a right outer peripheral edge 2b, a lower outer peripheral edge 2c, and a left outer peripheral edge 2d which have arc shapes having the same radius of curvature. Further, the outer peripheral edge of the front panel 2 is constituted of a first short outer peripheral edge 2e connecting the upper outer peripheral edge 2a and the right outer peripheral edge 2b, a second short outer peripheral edge 2f connecting the right outer peripheral edge 2b and the lower outer peripheral edge 2c, a third short outer peripheral edge 2g connecting the lower outer peripheral edge 2c and the left outer peripheral edge 2d, and a fourth short outer peripheral edge 2h connecting the left outer peripheral edge 2d and the upper outer peripheral edge 2a. Respective short outer peripheral edges 2e to 2h have arc shapes having the same radius of curvature as the outer peripheral edges 2a to 2d.

Points A to H in FIG. 5 indicate connecting points between the short outer peripheral edges 2e to 2h and the outer peripheral edges 2a to 2d.

A line segment connecting the points A and D is a planned folding line R1 and a line segment connecting the points B and C is a planned folding line R2. A line segment connecting the points E and H is a planned folding line L1 and a line segment connecting the points F and G is a planned folding line L2.

Figure 4A:
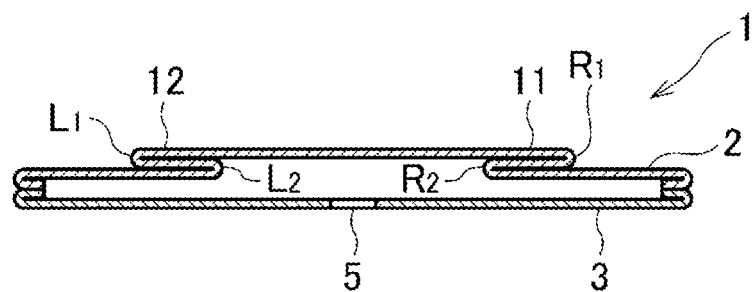
FIG. 4A is a cross-sectional view taken along the line IVa-IVa in FIG. 3

In the embodiment, as illustrated in FIG. 4A, the front panel 2 is formed into a circular shape having the same diameter as the rear panel 3 by being mountain-folded along the planned folding lines R1 and L1 and valley-folded along the planned folding lines R2 and L2. The front panel 2 is folded along the right-side planned folding lines R1 and R2 to form the right tuck portion 11 and the left tuck portion 12 is formed by folding the front panel 2 along the left-side planned folding lines L1 and L2.

The outer peripheral edge of the front panel 2 and the outer peripheral edge of the rear panel 3, both of which are formed in circular shapes, are sewn with the suture thread 10 (FIG. 2).

Figure 4B:
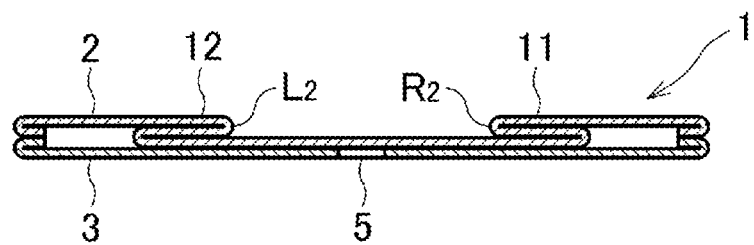
FIG. 4B is a cross-sectional view illustrating another example of a front panel.

In addition, like the driver-side airbag 1A illustrated in FIG. 4b, the front panel 2 may be valley-folded along the planned folding lines R1 and L1 and may be mountain-folded along the planned folding lines R2 and L2.

In this embodiment, the right and left tuck portions 11 and 12 extend in a vertical direction in a shoulder restraint area of the front panel 2. The distance between the tuck portions 11 and 12 is gradually reduced as the tuck portions extends to the lower side of the driver-side airbag 1. However, the tuck portions 11 and 12 may be parallel.

In order to form a recess 6 in the center lower side (chest restraint area) of the passenger facing surface of the inflated driver-side airbag 1, a tether 20 is disposed between the center lower side of the front panel 2 and the inflator opening 5.

As illustrated in FIG. 6, the tether 20 includes a center portion 24, a first leg 21 extending rightward from the center portion 24, a second leg portion 22 extending leftward from the center portion 24, a third leg portion 23 extending upward from the center portion 24, and arm portions 25 and 26 extending from the third leg portion 23 to the left and right sides. The first leg portion 21 extends in the lower right direction and the second leg portion 22 extends in the lower left direction. The first leg portion 21 and the second leg portion 22 extend slightly downward. Thereby, the nipping angle between the first leg portion 21 and the second leg portion 22 is smaller than 180°.

The third leg portion 23 is provided with an I-shaped slit 27 so as to extend in a right-left direction. The arm portions 25 and 26 are provided with tear lines 28 extending in a direction of the extension line of the slits 27. The tear line 28 has a configuration in which a plurality of short slits are arranged in a straight line.

Figure 3:
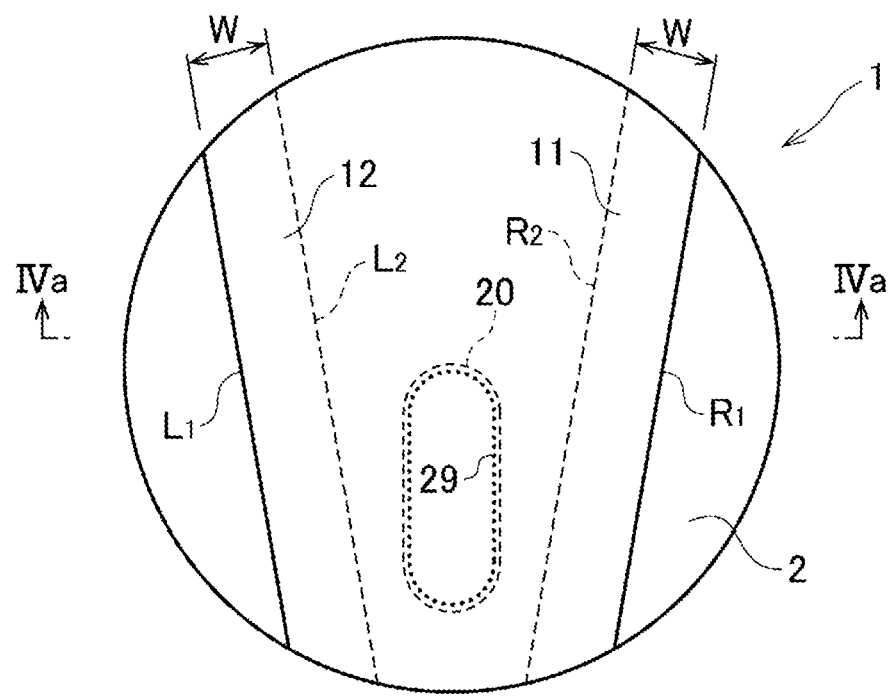
FIG. 3 is a plan view of the airbag according to the embodiment.

The center portion 24 has a substantially oval shape extending in the vertical direction. In the center portion 24, a portion of a stitch planned line 24a is sewn to the chest restraint area at the lower center of the front panel 2 by a suture thread 29 (FIG. 3).

The leg portions 21 to 23 have a base ends connected to the center portion 24 and openings 21h, 22h, and 23h having substantially the same diameter as the inflator opening 5 of the rear panel 3 are provided on the tip end sides. Although illustration is omitted, small holes for inserting bolts are provided around the openings 21h, 22h, and 23h.

In a state illustrated in FIG. 7, the tip end sides of the leg portions 21 to 23 are located on the same plane with the leg portions 21 to 23. However, the peripheral edge portions of the openings 21h to 23h are overlapped and sewn.

The peripheral edge portion of the inflator opening 5 of the rear panel 3 and the peripheral edge portions of the openings 21h to 23h of the leg portions 21 to 23 are interposed between a retainer 30 (FIG. 2) of the airbag device and an inflator mounting ring 31 in a state of the peripheral edge portions being overlapped. Stud bolts (not illustrated) provided on the ring 31 are inserted into small holes for inserting bolts (not illustrated) around the openings 21h to 23h of the legs 21 to 23, small holes for inserting bolts around the inflator opening 5 in the rear panel 3 (not illustrated), small holes for inserting bolts (not illustrated) of the retainer 30, and small holes for inserting bolts (not illustrated) of a flange portion of the inflator and tightened with nuts. Thereby, the airbag 1 and the inflator are mounted on the retainer 30. Further, the tip end sides of the leg portions 21 to 23 of the tether 20 are connected to the retainer 30.

Figure 1:
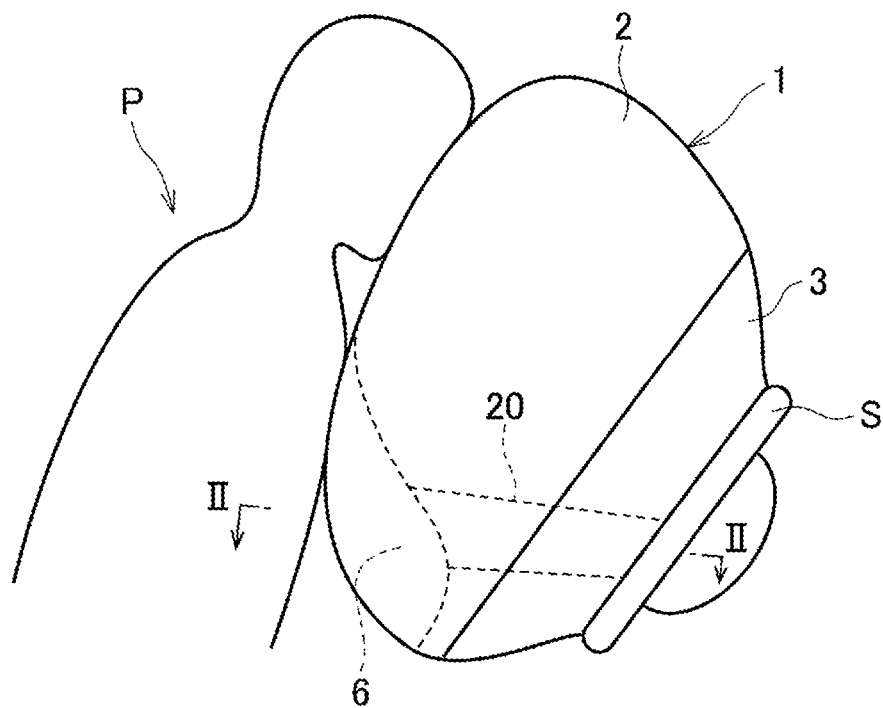
FIG. 1 is a side view of an airbag according to an embodiment when inflation is completed.

The driver-side airbag 1 is folded and attached to the retainer 30 together with an inflator and a module cover is covered to constitute a driver-side airbag device. This driver-side airbag device is mounted on a steering wheel S (FIG. 1). When the inflator is activated, the airbag 1 is inflated to restrain the passenger.

Since the front panel 2 of the airbag 1 has the tuck portions 11 and 12, the inflation thickness of the airbag 1 is large. In particular, the distance between the tuck portions 11 and 12 is gradually increased as it goes upward. Therefore, the inflation thickness of the upper portion of the driver-side airbag 1 in the final deployed state is large.

In this embodiment, the center portion 24 of the tether 20 is sewn to the center lower portion of the front panel 2, that is, the lower portion between the tuck portions 11, 12. Further, the tip end sides of the leg portions 21 to 23 of the tether 20 are connected to the retainer 30. Thereby, a recess 6 is formed in the center lower portion (chest restraint area) of the front panel 2. Thus, since the recess 6 is formed in the chest restraint area of the passenger facing surface, when a passenger P is restrained, the load applied to the passenger's chest is reduced. Further, since the tuck portions 11 and 12 are provided, the inflation thickness of the airbag 1 on both sides of the recess 6 is large. The shoulder portion of the passenger P is restrained by thick portions (shoulder restraining areas) on both sides of the recess 6.

In the embodiment, the leg portions 21 and 22 of the tether 20 have an upper side length "a" longer than a lower side length "b" as illustrated in FIG. 6. By appropriately selecting the lengths a and b, the connection angle between the center portion 24 and the arm portions 21 and 22 can be changed, whereby the area of the recess 6 can be adjusted.

In the embodiment, the arm portions 25 and 26 are provided on the third leg portion 23 and the slit 27 and the tear line 28 are provided. When the airbag 1 is inflated and deployed, if the tension applied to the leg portion 23 exceeds a predetermined level, the tear line 28 is cleaved starting from the slit 27 and the length of the leg portion 23 gradually increases. Therefore, the protrusion speed toward the passenger of a part of the front panel 2, which is the part connected to the leg portion 23, is controlled.

In the embodiment described above, widths W (FIG. 3) of the tuck portions 11 and 12 are uniform in the vertical direction. However, the widths W of the tuck portions 11 and 12 may be gradually increased as it goes to the upper side of the airbag 1.

In the embodiment described above, the tuck portions 11 and 12 are respectively provided on the right side and the left side of the front panel 2. However, a plurality of tuck portions may be provided.

In the embodiment described above, the right tuck portion 11 and the left tuck portion 12 are separated in a non-parallel manner. However, it may be parallel as described above. Further, the lower end of the right tuck portion 11 and the lower end of the left tuck portion 12 may be V-shaped.

In the above description, the tuck portions 11 and 12 are provided only on the front panel 2. However, the tuck portions may also be provided on the rear panel 3. In this case, the tuck portion of the rear panel may be provided in a positional relationship overlapping with the tuck portion of the front panel 2. Further, the tuck portion may be arranged only at the upper portion of the rear panel or more tuck portions may be arranged at the upper portion of the rear panel than the lower portion of the rear panel. In this case, as the tuck portion of the rear panel, a tuck portion extending in the right-left direction, a tuck portion extending from the upper right to the lower left, and a tuck portion extending from the upper left to the lower right may be provided. Further, the tuck portion extending from the upper right to the lower left of the rear panel and the tuck portion extending from the upper left to the lower right may intersect at the upper half of the rear panel.

The embodiment described above is an example of the invention and the invention may be configured other than illustrated. The invention is not limited to the driver-side airbag and can be applied to an airbag for a passenger seat, an airbag for a rear seat, and the like. In addition, when the airbag of the invention is a driver-side airbag, it is suitable for installing in the steering hub part from which a hub part is a non-rotating type.

Although the invention has been described in detail using the specific embodiment, it will be apparent to those skilled in the art that various modifications can be made without departing from the spirit and scope of the invention.

This application is based on Japanese Patent Application No. 2017-181450 filed on Sep. 21, 2017, which is incorporated by reference in its entirety.

REFERENCE SIGNS LIST

1: driver-side airbag
2: front panel
3: rear panel
5: inflator opening
6: recess
11, 12: tuck portion
20: tether
21 to 23: leg portion
24: center portion

The invention claimed is:

1. An airbag which is formed by connecting peripheral edges of a front panel and a rear panel, wherein
the front panel has a tuck portion in a passenger's shoulder restraint area, and
a tether connecting a chest restraint area of the front panel and the rear panel is provided; wherein
the tether is connected to a lower center side of the front panel; and,
the tether includes:
a center portion connected to the front panel;
a first leg portion extending from a right side of the center portion;
a second leg portion extending from a left side of the center portion; and
a third leg portion extending from an upper side of the center portion.

2. The airbag according to claim 1, wherein
the tuck portion includes at least a left tuck portion which extends downward from an upper left and a right tuck portion which extends downward from an upper right.

3. The airbag according to claim 2, wherein
a distance between the left tuck portion and the right tuck portion is gradually reduced as the distance goes to a lower side.

4. The airbag according to claim 2, wherein
the left tuck portion and the right tuck portion are separated.

5. The airbag according to claim 2, wherein
a lower end of the left tuck portion is in contact with a lower end of the right tuck portion.

6. The airbag according to claim 1, wherein
the third leg portion includes an arm portion extending laterally,
the arm portion includes a tear line, and
the third leg portion includes a slit located on an extension line of the tear line.

7. An airbag device, comprising:
the airbag according to claim 1, and
an inflator for inflating the airbag.

8. The airbag device according to claim 7, wherein
a tip side of the tether is connected to a steering side by an inflator mounting ring for attaching the inflator to a retainer.

* * * * *